June 13, 1967     J. N. KENNING     3,325,028
UNLOADING DEVICE FOR BOXES OR BINS
Filed March 22, 1965     4 Sheets-Sheet 2
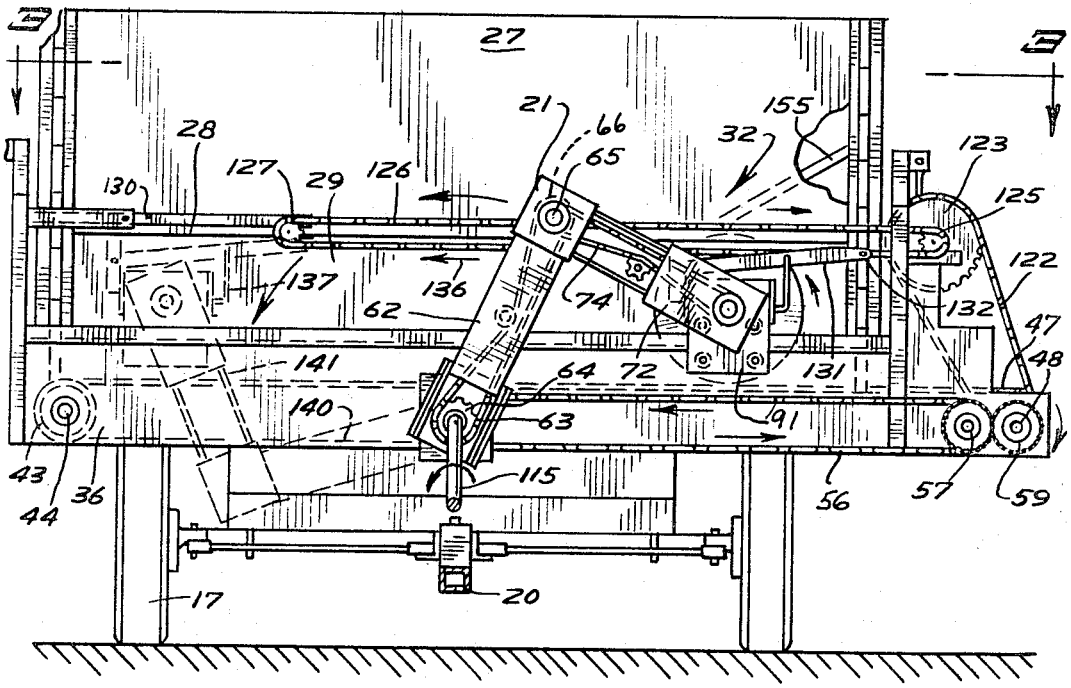
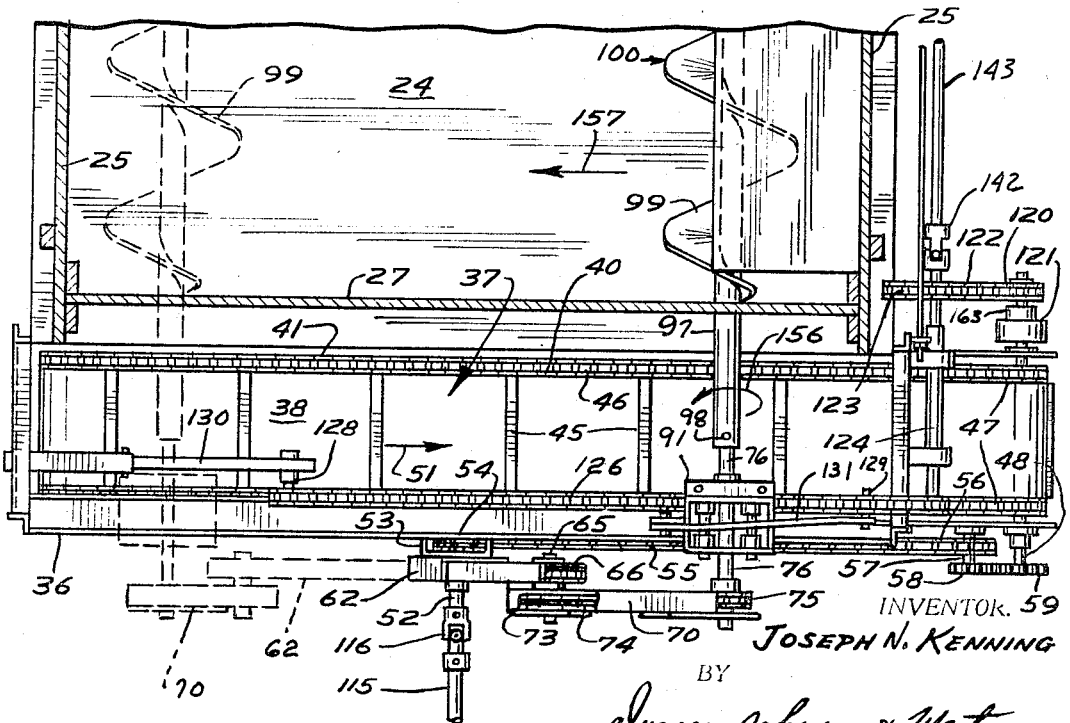
INVENTOR.
JOSEPH N. KENNING
BY
Dugger Johnson & Westman
ATTORNEYS June 13, 1967 J. N. KENNING 3,325,028

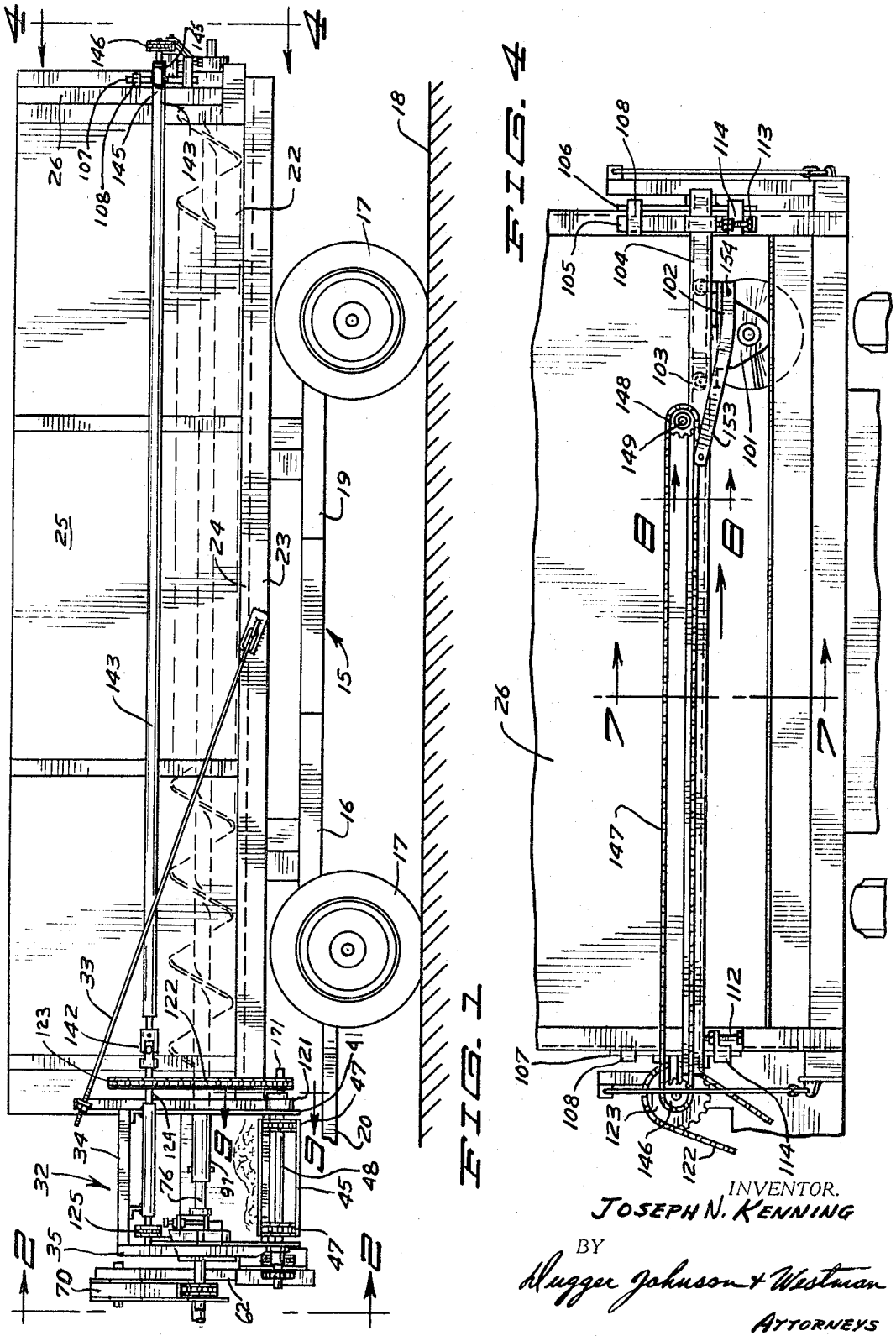

UNLOADING DEVICE FOR BOXES OR BINS

Filed March 22, 1965 4 Sheets-Sheet 3

INVENTOR.
JOSEPH N. KENNING
BY
Dugger Johnson & Westman
ATTORNEYS

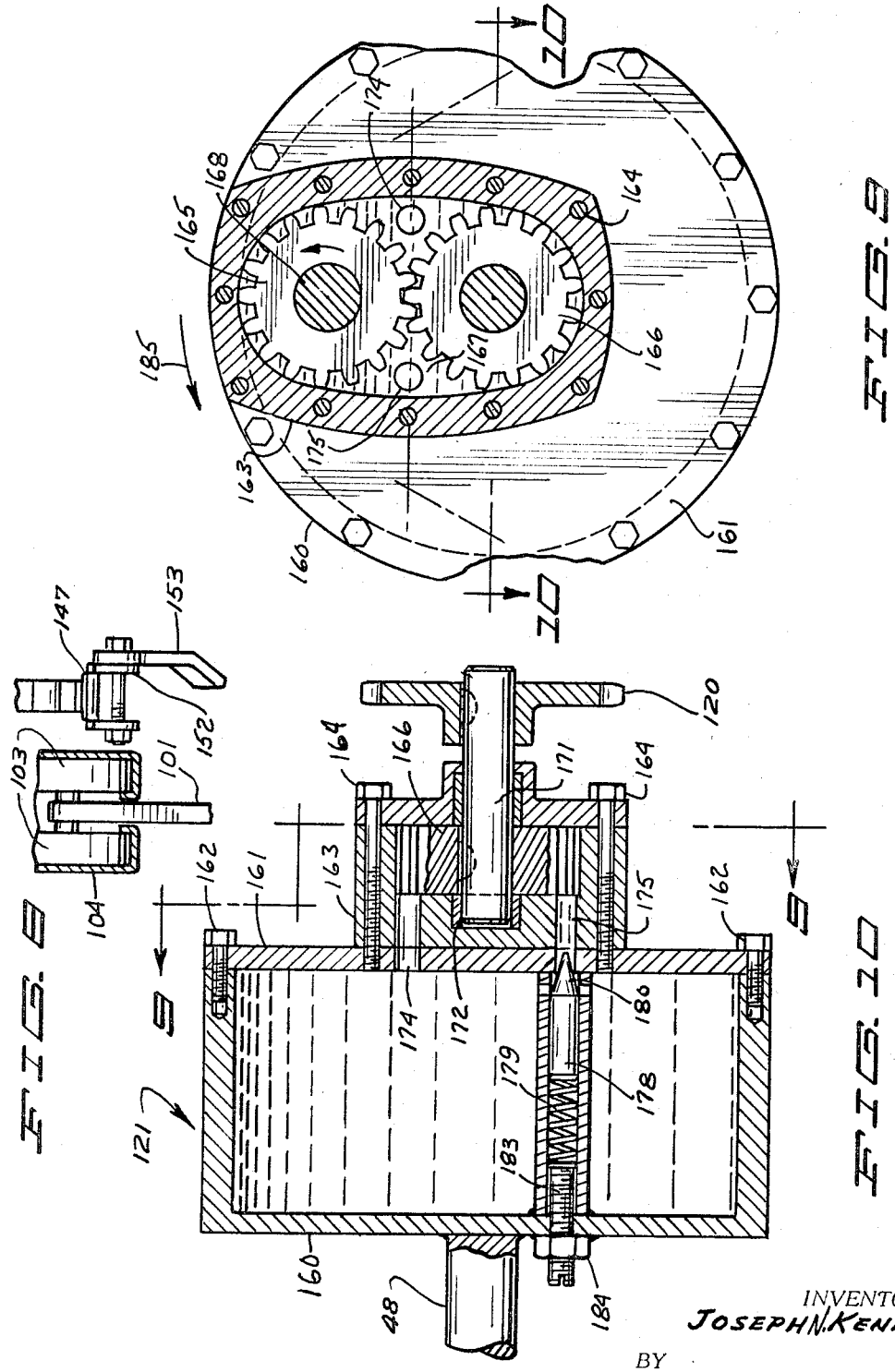

3,325,028
UNLOADING DEVICE FOR BOXES OR BINS
Joseph N. Kenning, Rte. 3, St. Cloud, Minn. 56301
Filed Mar. 22, 1965, Ser. No. 441,722
8 Claims. (Cl. 214—520)

This invention has relation to unloading devices and more particularly to a conveyor unloading device which can easily be installed in mobile forage boxes or feed bins and will operate to completely unload or empty the structure in which it is installed quickly, easily and economically.

At the present time, in particular, mobile forage boxes have very complex conveyor mechanisms on the bottom thereof together with a plurality of large beaters at the front end. The bottom conveyor will move any load in the box up against the forward rotating beaters, the beaters will separate the load and deposit it onto a cross conveyor which in turn will discharge the material from the box into a suitable bunk feeder or other device.

The devices presently on the market are highly complex and cannot be installed easily on conventional farm wagons or forage boxes nor can they operate satisfactorily under all load conditions.

The amount of mechanism used in the forage boxes presently on the market is excessive and very expensive. In particular, the long bottom conveyor that is normally installed in boxes and the beaters used for shredding the material are extremely difficult to install, costly to maintain, expensive to make, and the beaters can be dangerous.

The device of the present invention, as shown, illustrates an auger unloader for forage boxes, feed bins, or other storage units which is mounted in the box or bin and extends across the bottom thereof. The auger is mounted at the bottom of the box or bin on suitable tracks at opposite ends thereof so that it can move in the box transversely as a unit. The material is merely filled into the box above and surrounding the auger. Suitable drive mechanism is provided for roatating the auger about its axis in a direction so that it discharges the material surrounding the auger at the desired end. Mechanism is also provided for traversing the auger back and forth across the bottom of the bin or box at the same time the auger is rotated. The drive mechanism for traversing the auger is designed so that it can exert only a predetermined amount of force tending to cause the auger to traverse. The auger will traverse at the same time it is rotating, thereby discharging material as it moves. The auger will actually eat its way into the load surrounding it and will do so only with the predetermined amount of force that its driving mechanism permits. This will prevent the auger from jamming into the load and freezing up as it is unloading.

By proper adjustment of the force with which the auger traverses in the box or bin, the proper relationship can be established so that the auger will not freeze or jam, but will continue just to eat its way into the load as it traverses and discharge the material at one end of the auger. The auger will traverse back and forth across the load the number of times necessary to completely unload the box or bin, and when it is done, the power will be shut off and the bin or box can be refilled.

The device will find its primary usage in the mobile forage box field, as well as for unloading feed bins on farmsteads. It does not require the large separating beaters at the front of the forage box in order to unload forage material, as is common at the present time, and therefore it can easily be installed onto existing farm wagons. Further, the type of mechanism for traversing the auger in its installation can be of any type that will exert only a predetermined maximum force to cause traversing and the type of mechanism is not limited to those shown in the disclosure.

It is an object of the present invention to present an unloading device for receptacles which uses a traversing auger conveyor to completely unload the receptacles without complex mechanism.

In the drawings,

FIG. 1 is a side elevational view of a forage box having an unloading device made according to the present invention installed thereon;

FIG. 2 is a front elevational view of the device of FIG. 1 taken as on line 2—2 of FIG. 1;

FIG. 3 is a sectional view taken as on line 3—3 in FIG. 2;

FIG. 4 is an end elevational view taken as on line 4—4 in FIG. 1;

FIG. 8 is a fragmentary sectional view taken as on line 8—8 in FIG. 4;

FIG. 9 is a sectional view of a force limiting device for driving the traversing auger, and taken as on line 9—9 of FIG. 10; and FIG. 10 is a sectional view taken as on line 10—10 in FIG. 9.

Figure 5:
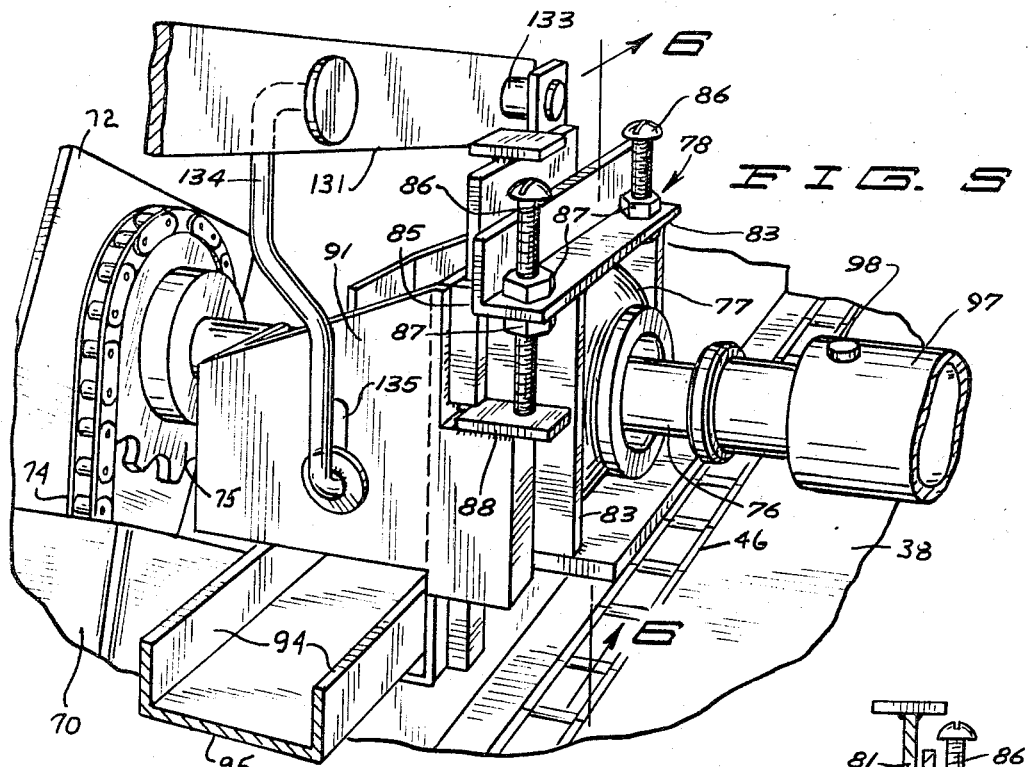
FIG. 5 is a fragmentary perspective view of the mounting of the auger used with the unloading device of the present invention and looking in a forwardly direction.

Referring to the drawings and the numerals of reference thereon, a forage box or receptacle embodying the improvement of the invention is illustrated generally at 15. A conventional trailer support mechanism 16 that has wheels 17 for movement over the ground 18. The trailer has a frame 19 and a forwardly extending tongue 20 that can be attached to a farm tractor or other vehicle for pulling the unit over the ground.

A wagon box or receptacle 22 is mounted on the trailer frame 19 with suitable conventional means. The wagon box has a plurality of longitudinally extending supports 23 which support a floor 24. The box also has vertical side panels 25, 25 a rear end panel 26 and in the form of the invention shown, a front end panel 27 is provided. The front panel 27 is terminated above the floor 24 as can be seen in FIG. 2. The space between the lower edge 28 and the floor 24 of the box is to permit material in the box to be discharged out through the opening illustrated in 29.

A front frame assembly illustrated generally at 32 is mounted at the front of the box with suitable brackets and braces 33. Bolts can be used for mounting the front frame 32 on the front portions of the box. The front frame 32 includes upper horizontal support members 34 and vertical support members 35 jointed together to form the frame. At the lower portion of the front frame member 32 a forward transverse mounting member 36 is provided. The forward transverse mounting member is an integral part of the frame.

The frame 32 supports a front cross feed conveyor 37 which has a floor member 38 mounted to the forward transverse mounting member 36 and also mounted to a rear transverse support member 41. A chain and slat type conveyor 42 is used on the cross feed conveyor 37. The chain and slat type conveyor comprises a pair of spaced apart substantially parallel steel link chains 46, 46 that are mounted over sprockets 43 (shown in dotted lines, FIG. 2) at one side of the box. The sprockets 43 are mounted onto a shaft 44 that is mounted in suitable bearings on the transverse members 36 and 41 of the frame 32. A plurality of slats 45 extend between and are fastened to the chains 46, 46 in a conventional manner.

At the opposite end of the conveyor, chains 46, 46 are mounted over sprockets 47, 47 that in turn are drivably attached to a drive shaft 48 that is mounted in suitable bearings on the transverse support members.

The cross conveyor assembly 37 is designed to move in a direction as indicated by arrow 51 (FIG. 3) when the unit is powered and to discharge any material dropped onto the floor 38 out the open end of the cross conveyor, over shaft 48.

At the front of the frame 32, a jack shaft 52 is mounted in a front bracket 53 on suitable bearings (not shown) and also extends rearwardly and is suitably mounted in one of the transverse support members of frame 32 on bearings as well. A sprocket 54 is drivably mounted onto the shaft 52 directly in front of the transverse mounting member 36 and a chain 55 is drivably mounted with sprocket 54 and extends to be mounted over a sprocket 56 which in turn is rotatably mounted on an idler shaft 57. The idler shaft 57 can be fixed on the front plate 36 and any brackets that are necessary to steady the shaft can be used.

At the outboard end of the shaft 57 a spur gear 58 is rotatably mounted. The sprocket 56 and gear 58 are drivably attached to each other. The sprocket and gear can be attached to a common hub or joined with spacers and bolts. The gear 58 drivably engages another spur gear 59 that is drivably mounted onto the shaft 48 and drives the shaft 48 in proper direction when a standard power take off is used to drive shaft 52. For getting the proper direction of rotation of the shaft 48, the chain 55 could be mounted with a reverse wrap over a sprocket on shaft 48 or over the sprocket on shaft 52 and obtain the same effect. The chain and slat conveyor convey material to the open end of the conveyor.

An arm 62 is also mounted on the shaft 52. The arm 62 is mounted on the shaft with a suitable bearing or bearings, so that the shaft 52 can rotate without driving the arm and the arm in turn is free to move about the axis of the shaft as the shaft rotates.

The arm 62, as shown, is a hollow box shape for most of its length and is formed as an open channel shaped member adjacent the end mounted on the shaft 52. The sprocket 63 is drivably mounted onto shaft 52 within the arm and a chain 64 is mounted over the sprocket 63 and extends outwardly through the arm opening toward the outer end of arm 62. At the outer end of the arm 62 a shaft 65 is rotatably mounted in suitable bearings. The shaft 65 is substantially parallel to the shaft 52 and extends beyond the arm 62. A sprocket 66 is drivably mounted on the shaft 65 inside the arm opening and the chain 64 is mounted over this sprocket. A suitable tightener can be provided inside the arm for keeping the chain 64 under proper tension.

On the outer end of the shaft 65, which extends forwardly beyond the arm 62, a second arm 70 is rotatably mounted in suitable bearings. The shaft 65 can rotate in the bearings without moving arm 70 and the arm 70 can also pivot about the axis of the shaft 65 independent of arm 62. The arms 62 and 70 move in a "jack knife" movement relative to each other. The arm 70, as shown, is a channel shaped member having a pair of plates 71 and 72 that box in the arm at its opposite ends.

A sprocket 73 is drivably mounted on the shaft 65 within the arm 70 and a chain 74 is mounted over this sprocket and extends toward the outer end of the arm 70.

Figure 6:
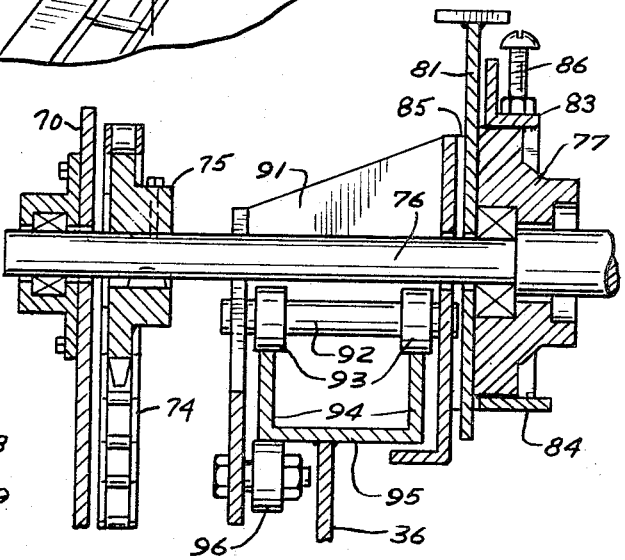
FIG. 6 is a sectional view taken as on line 6—6 in FIG. 5.
Figure 7:
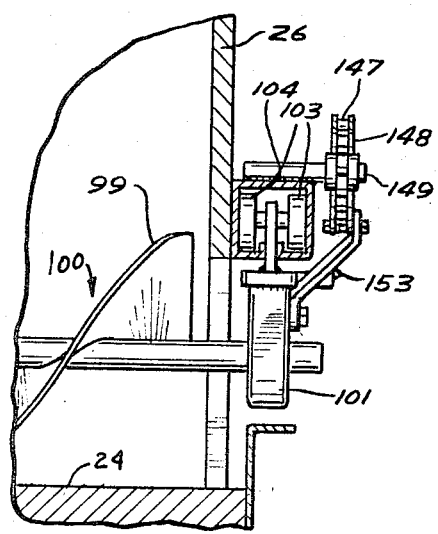
FIG. 7 is a fragmentary sectional view taken as on line 7—7 in FIG. 4.

The chain 74 is in turn mounted over an outboard sprocket 75 that is mounted onto a shaft 76. The shaft 76 is rotatably mounted to the arm 70 at the outer end thereof on suitable bearings. The shaft 76 also extends rearwardly toward the wagon box and is mounted in a suitable bearing assembly 77 that is, in turn, mounted in a bearing hangar assembly 78. The hangar assembly 78 is shown in FIG. 5 and 6 in greater detail.

The bearing hangar assembly 78 includes a main plate 81 which holds the bearing assembly 77 (including the bearing and its housing). The bearing assembly is held in place on plate 81 in a suitable manner for example, as shown, with a pair of vertical plates 82, 82 and upper and lower horizontal members 83 and 84, respectively. The plates 82, 83 and 84 are welded to plate 81.

The main plate 81 and its attached plates and the bearing are mounted for vertical slidable movement with respect to a carriage 91. A pair of suitable grooved brackets 85, 85 are fixed to the carriage and are recessed to slidably receive the opposite side edges of the plate 81 and will prevent the plate from moving in direction along the axis of the shaft 76 but will permit the movement of the shaft up and down in a vertical direction. The upper member 83 is used for mounting a pair of stop bolts 86, 86 that are threaded through to suitable nuts 87 and extend down to engage a pair of stop brackets 88, 88, which are also fixed to carriage 91, so that the shaft 76 is held from moving downwardly more than a certain amount. The plate 81, bearing assembly 77 and shaft 76 will be free to move upwardly.

The carriage 91 is a unit for supporting the bearing and shaft 76 and is provided with a pair of parallel, spaced apart shafts 92, 92 on which rollers 93 are rotatably mounted. The rollers 93 (there are four on the carriage 91) ride on opposite legs 94, 94 (see FIG. 6) of a channel shaped track member 95 which extend transversely across the width of the forage box and in turn is mounted onto the transverse member 36.

In addition, guide rollers 96 can be provided on the carriage adjacent the bottom surface of the channel member 95 to prevent the carriage from moving upwardly and coming off the track. The carriage has portions extending alongside the sides of the track to prevent the carriage from coming off the track in fore and aft directions. The carriage is then free to move along the channel member 95 transversely across the box.

Suitable slots or openings are provided in the carriage for the passage of the shaft 76 from front to rear through the carriage.

The movement of the carriage back and forth across the box on the channel 95 is controlled through suitable drive mechanism, which will be explained subsequently.

The rearward end of shaft 76, as shown in FIG. 5, fits inside an auger tube 97 and is fastened thereto with a suitable pin 98. The auger tube 97 has auger flights 99 attached thereto forming an auger or screw conveyor assembly 100. The auger assembly 100 extends longitudinally of the box and is supported at the front end thereof on the shaft 76 and the carriage 91. The tube 97 has a shaft inserted into it at the rear thereof and the shaft is mounted in a bearing 101 that in turn is mounted onto a bearing hangar 102. The bearing hanger 102 has suitable rollers 103 rotatably mounted thereon, which fit inside a track 104 that extends transversely across the box and is mounted thereon at the rear thereof. The track 104 is outside the rear panel of the box. The track 104 is a conventional door track with the rear bearing hangar 102 and its rollers 103 adapted to be carried thereon. The rear shaft for the auger extends through a provided opening in the rear end panel. The rear panel is raised above the floor.

As can be seen in FIG. 4, the track 104 has a first rear guide strap bracket 105 welded or otherwise suitably attached thereto and a pair of side guide strap brackets 106 and 107, also fixed thereto. The side brackets 106 and 107 and the end bracket 105 are all slidably mounted for vertical sliding movement in suitable offset straps 108 that are attached to the opposite corner posts of the wagon box. The track 104 is thus held from side to side movement by the brackets 106 and 107 and is also held by the bracket 105.

The downward movement of the track 104 is stopped through the use of stop bolts 112 and 113 which extend through brackets 114, 114 which are fixed to the box. The stop bolts engage the track 104 to hold it at the proper vertical height above the floor of the wagon box. The stop bolts 113 can be adjusted in the conventional manner and are provided with nuts as shown to permit this adjustment. The track can move upwardly as far as permitted by the brackets 105, 106 and 107 sliding in their provided off set straps.

The bearing hangar 102 is movable transverse to the wagon box back and forth along the track 104 in the same manner that the carriage 91 is movable on the track 95. There is mechanism provided for moving the bearing hangar 102 back and forth at the same time and at the same speed as carriage 91.

Referring again to the forward portions of the forage box, and FIGS. 1, 2 and 3, the shaft 48 on the outer end of the cross conveyor is driven through the previously explained chain and sprockets 54, 55 and 56 and the gears 57 and 58 whenever the shaft 52 is powered. The shaft 52, is powered from the power take off of a tractor or other unit which drives a power take off shaft 115, that is connected to shaft 52 with a universal joint 116.

When the shaft 48 is turning, it in turn will drive a sprocket 120 that is drivably connected to the shaft 48 through a torque or force limiting device 121. The torque limiting device can be any unit such as a conventional friction type slip clutch, a fluid torque coupling or other torque limiter that will operate under sustained periods of slipping at low torques. The torque limiting device in this embodiment is shown in FIGS. 9 and 10 and will subsequently be explained in greater detail.

A chain 122 is mounted over sprocket 120 and extends upwardly to a large sprocket 123 that is mounted on a cross shaft 124. The cross shaft 124 is spaced above the top of the cross conveyor and is mounted in suitable bearings on the frame 32.

At the opposite end of the cross shaft 124 from sprocket 123, a small sprocket 125 is drivably mounted. The sprocket 125 in turn has a chain 126 mounted thereon. The chain is a steel link chain and extends transversely part way across the front of the forage box and is mounted on a sprocket 127 that is rotatably mounted onto an idler shaft 128, which in turn is mounted to a suitable support member 130 that extends over to the opposite side of the box from shaft 124. The chain 126 is an endless steel link chain that has an attachment link 129 to which a connecting link 131 is pivotally mounted as at 132. The attachment chain link can be purchased or made by welding a pair of clips to an ordinary chain link (see FIG. 8 for a typical link). The connecting link 131 extends from the chain to the carriage 91 and is pivotally mounted as at 133 to the carriage. A control arm 134 is pivotally mounted to an intermediate portion of the connecting link. The control arm 134 has an end portion bent at 90° to the main portion and which is received within a slot 135 on one wall of the carriage 91. The control arm 134 controls the amount the connecting link can pivot. The connecting link pivots only a limited amount about its pivot point 133 where it attaches to the carriage.

When the shaft 124 rotates (through torque limit device 121 and chains and sprockets) and drives sprocket 125 and chain 126, the carriage 91 will be moved in accordance with the direction of travel of the attachment link of chain 126. As can be seen when the attachmet link 129, which drives connecting link 131 is on the lower reach of the chain 126, as shown in FIG. 2, the carriage 91 will be moved in direction as indicated by arrow 136. When the chain has traveled so attachment link 129 is in position as shown in dotted lines at 137 the carriage 91 and auger assembly will be all the way over to the left side of the box (as viewed in FIG. 2) and as the attachment link travels around the sprocket 127 the direction of travel of the carriage 91 will reverse and the carriage will be pulled by the connecting link 131 in opposite direction from that indicated by arrow 136 until it is over at the opposite side of the box or receptacle. Thus the carriage 91 will traverse back and forth across the box when chain 126 is driven. The shaft 76 and the auger assembly, of course, will be transported along with the carriage.

It should be noted that the two arms 62 and 70 which carry the chain to rotate the shaft 76 and thus the auger will be free to pivot about their respective points and when the carriage is all the way to the left, as shown in dotted lines at 137, (FIG. 2) the lower arm 62 will have pivoted down as shown in dotted lines at 140 and the upper arm 70 will be in the position as shown in dottled lines at 141. Thus, the arm 62 will pivot about the shaft 52 and the arm 70 will pivot about the shaft 65 as needed to permit the carriage to move transversely back and forth. The pivoting of the arms 62 and 70 will be controlled by movement of the carriage 91. The drive chain from shaft 52 to shaft 76 will remain unchanged in length so that the auger shaft will be rotated at the same time the auger is traversing.

The shaft 124 (driven by sprocket 123) is also connected through a suitable universal joint 142 to a longitudinally extending side shaft 143 that extends from the forward portions of the wagon box to the rear portions thereof. The shaft 143 is situated outside of and extends along on side panel of the forage box. The rear end of the long shaft 143 (which, as shown, is tubular in order to save weight and increase strength), has an end member 144 which is rotatably mounted in a bearing or bushing 145. The bearing 145 is attached to the wagon box.

At the outer end of the shaft 143, a sprocket 146 is drivably mounted. The sprocket 146 in turn has a chain 147 mounted thereover and the chain 147 in turn is mounted onto an opposite sprocket 148 that is rotatably mounted onto a shaft 149 that can be mounted directly onto the track 140 in a suitable manner. The shaft can be welded to the track, if desired. The outer end portion of the shaft 149, of course, will be free to permit the sprocket 148 to be rotatably mounted thereon. The axis of shaft 149 is substantially coincidential with the axis of shaft 128 at the front end of the box. The chain 147 will also have an attachment link 152 (FIG. 8) thereon to which a connecting link 153 is pivotally attached. The connecting link 153 in turn is pivotally attached as at 154 to the bearing hangar 101. A stop member on the bearing hangar is used to prevent the link 153 from pivoting upwardly too far. Whenever the shaft 143 is driven the chain 147 will travel around the sprockets 146 and 148 and this will cause the connecting link to move the bearing hangar 101 back and forth across the forage box at the same speed and in the same relative position as the carriage 91 traverses. The front traversing chain 126 and rear traversing chain 147 are driven from a common shaft. Their drive sprockets are also the same size so the chains move at the same linear speed.

A shield board 155 is attached to the side panel 25 of the wagon adjacent the discharge end of the cross conveyor and is positioned high enough so that the auger conveyor will fit underneath this board when the auger is all the way over toward that side of the box. The board will shield the auger from material deposited in the box so that the auger can initially start rotating without having material piled on top it after a load has been placed in the wagon.

The torque limiting device 121 for the sprocket 120 which limits the torque applied to the shaft 124 and 143 is one of the keys to the invention. The torque can be set with the torque limiting device 121 so that the force exerted on the carriage 91 in front, and the bearing hangar 101 at the rear, which together support the auger, can be accurately controlled to a low amount. This will permit the auger to be eased into the load in the box and remove material at its own rate and will prevent the unit from jamming the auger into the load. An auger will unload material even if it is not placed in an outer housing.

The force limiting device 121 for driving the auger transversely in the box or bin is illustrated in FIG. 9 and 10. The device 121 is a fluid actuated torque limiting device and is designed so that it can be adjustable in the amount of force it will transmit and will slip for long periods of time without needing adjustment or repair.

As shown, a reservoir housing 160 is welded to the outer end of shaft 48. The housing 160 has a cover plate 161 fixed thereto with suitable cap screws 162. Thus, whenever the shaft 48 is turning, the housing 160 and cover 161 will also be rotated. The reservoir is filled with a suitable fluid and a filler plug can be provided. A conventional gear type hydraulic pump 163 is bolted into position with long cap screws 164 to the outside of the cover 161. As shown, the pump includes a first gear 165 and a second gear 166 which are both rotatably mounted in the pump housing and operate in a provided chamber 167 inside the pump. The first gear 165 has short stub support shaft 168 that is dead-ended in the pump housing in a conventional manner and the gear is rotatbly mounted in the housing. The shaft 168 for gear 165 does not extend outside the housing of the pump.

The second gear 166 is drivably mounted on a shaft 171 which has one end suitably mounted in bushing, as at 172 and the other end of the shaft is suitably mounted in a bushing and extends outwardly beyond the cover plate 173 of the pump. A standard seal can be provided for the shaft. The sprocket 120 is drivably mounted on the outer end of this shaft 171. The axis of shaft 171 is coincidental with the axis of shaft 48.

The pump also has an intake port 174 which opens into the chamber 167 and a pressure discharge port 175 which is on the opposite side of the chamber 167.

A sleeve 176 is mounted to the reservoir housing 160 as shown, on the wall thereof opposite cover 161. The sleeve 176 has a plurality of holes 177 defined therethrough adjacent the cover 161. When the cover 161 is in place the sleeve seals against the cover a sufficient amount to prevent excessive leakage at the junction.

A plunger type relief valve element 178 is slidably mounted inside the sleeve 176 and a spring 179 is positioned behind the element. The element has a conically shaped forward portion 180 which seats against the peripheral edges of the pressure port 175 leading from the pump 163. (Note that the conical portion 180 actually seats on the part in the housing cover.)

An adjustment screw 183 is threadably mounted in a nut 184 which in turn is welded to the housing 160, for adjusting the force with which spring 179 pushes the valve member 178 toward pressure port. This will determine the pressure at which the valve member will move away from the port and permit fluid to flow out through the pressure port. In this way the pressure which the pump will generate can be controlled.

The operation of the device is as follows. When the shaft 48 is driven, the housing 160 will be driven and therefore the pump body will also be rotated in direction as indicated by the arrow 185. This will tend to cause the first gear 165 to rotate about the second gear 166. However, in order to do this, fluid must be taken in through the intake port 174, carried around the gear 165 in the pockets between the teeth on the gear and discharged out through the pressure port 175. The discharge port is closed with a relief valve so the gear 165 will not be free to rotate about the gear 166. This will mean that the gear 165 will then form a driving relationship with the gear 166 and cause the gear 166 to move about its axis. There will then be no relative rotation between the two gears and the sprocket 120 will therefore be driven.

If there is a force tending to prevent the sprocket 120 from rotating, and if this force exceeds a predetermined amount, the resistance to rotation will result in the pressure on the pressure side of the pump, which is open to port 175, to build up and exceed that which is necessary to move the valve member 178 away from its seat. The fluid will then, when the pressure exceeds this amount, be free to flow through the port 175 and out through the openings 177 back into the reservoir. When this occurs, the gear 165 and the housing will then rotate about the gear 166 and the gear 166 will remain stationary. This will permit the sprocket 120 to stand still while the shaft 48 is rotating. The force exerted by the gear 165, tending to drive the gear 166, will never exceed the amount which results in a pressure that will open valve 178. When the force on the sprocket 120 drops below the predetermined amount, the sprocket 120 will then be driven, as fluid will no longer flow out through the relief valve assembly and gear 165 will drive gear 166.

In this manner, a very accurate control of the amount of force exerted by the sprocket 120 (in this form of the invention it is actually a torque control) is obtained. Because the sprocket 120 controls the drive for the traversing of the auger, the force with which the auger is traversed or moved into the load is also accurately controlled. The device shown will permit sustained slipping of the force limiting device, if necessary.

As stated previously, an ordinary friction disc slip clutch can be used but the material or construction must be selected so that the disc will transmit low torque and will slip for extended periods of time, if necessary.

Because the axis of the shaft 171 is coincidental with the axis of shaft 48, this type of drive will work very well and the sprocket 120 will not move eccentrically.

Assuming that a load of forage is placed in the wagon, and is to be discharged, the power take off of the tractor or prime mover is started and this will drive shaft 115 and therefore shaft 52. As soon as the shaft 52 is rotating, this will cause the auger itself to rotate in direction as indicated by the arrow 156 in FIG. 3. The auger will be rotated through the chain and sprockets inside arms 62 and 70. As stated previously, the auger will initially be underneath the shield board 155 so that the material in the box will not be jammed down onto the auger flight and the auger can rotate quite easily to start.

At the same time, the sprocket 54 will be driven which in turn will drive chain 55 and through the previously described chain and gear drive, rotate shaft 48. This will start the cross conveyor moving so that the flights 45 of the cross conveyor will move any material resting on the floor member in direction as indicated by arrow 51 and out over the open end of the cross conveyor. At the same time, the sprocket 120 will be urged, under the action of the torque limiting device 121, to rotate. If the auger assembly 100 is free to move transversely in direction away from the board 155, and does not jam up against the load, the torque limiting device will drive sprocket 120 and thus the shafts 124 and 143 will rotate, driving the sprockets 125 and 146 and chains 126 and 147. The carriage 91 and bearing hangar 101 will be moved in direction as indicated by the arrow 157 in FIG. 3.

The front connecting link 131 will be under compression and will tend to rotate about the pivot 133. However, the arm 134 will prevent the link from going over center around this pivot because the arm is held within the slot 135 of the carriage. The shaft 143 will also, at the same time, and at the same speed, drive chain 147. This will cause link 153 to move bearing hangar 101 along track 104. The stop on the hangar prevents link 153 from going over center when it is under compression. When the attachment links of chains 126 and 147 are on the top reach of their respective chains, the connecting links 131 and 153 are under tension and the auger is moved toward its starting position.

Thus both ends of the auger will be simultaneously urged in direction as indicated by arrow 157 under a controlled force. At the same time, the auger will be rotationally driven through chains 64 and 74. The controlled traversing force will prevent the auger from being jammed into the load that may be present, and always will permit the auger to rotate convey material longitudinally along its length and thereby to eat its way into the load. Whenever the auger has removed sufficient material so that the torque limiting device 121 will drive sprocket 120 and shaft 124 and 143, the auger will be traversed. However, if the force of the load against the auger is greater than the traversing force which can be transmitted by the torque limiting device 121 the auger will merely stand still as far as traversing is concerned, and rotate about its longitudinal axis in one position until a sufficient amount of material has been removed by it to permit it to again move in direction as indicated by arrow 157.

Once the auger has gone all the way over to the left hand side of the unit, as shown in the drawings, it will reverse direction and the action will be exactly the same. The auger will eat its way into any load in the receptacle under the force permitted by the torque limiting device 121.

The auger will rotate in direction as indicated by the arrow 156 and material on the auger will be conveyed forwardly and deposited on the floor 138 of the cross conveyor. The cross conveyor assembly will then carry this material off to the side and discharge it over the open end of the cross conveyor.

The example disclosed is a mobile forage box of the type usually used for unloading forage into silos or bunk feeders. However, the invention will work well in stationary feeders or grain bins as well.

Also, the type of drive used for rotating the auger and for causing the auger to traverse can be varied to suit individual situations. For stationary installations an electric motor could be mounted directly on the carriage 91 and belted to drive the auger. Also, the drive for traversing the auger can be changed. For example a ratchet drive can be used for the traversing chains. Ratchets that will advance only when there is less than a predetermined resistance can be used. The power train for the traversing device must have some type of slip clutch or force limiting means so that the maximum force with which the auger can be traversed can be controlled.

The term receptacle in the claims is specifically meant to include a mobile box or a stationary bin.

The openings at the front and rear of the box can be closed sufficiently to prevent material from coming out the openings, or the auger can be mounted to minimize the openings and control any leakage. The openings can be suitably baffled, as well, to prevent loss of material.

What is claimed is:

1. An unloading device for a receptacle having a bottom surface and at least two spaced apart substantially parallel walls, said device including a screw conveyor mounted in said receptacle adjacent the bottom surface thereof, and substantially parallel to said walls, first power means to rotate said screw conveyor about its axis in direction to convey material in the receptacle toward one end of the screw conveyor, second power means to move said screw conveyor substantially transverse to its axis of rotation alternately back and forth between the walls of said receptacle at the same time the screw conveyor is rotating, said power means including means to limit the maximum force which can be exerted to cause the screw conveyor to move transverse to its axis and a shield attached to one of said walls immediately above the at rest height of the conveyor, said shield being of size to prevent material from falling down onto said conveyor when the conveyor is next adjacent to said one wall.

2. An unloading device for a receptacle having a bottom surface and side walls, said device including a pair of tracks extending between the side walls at opposite ends thereof, separate carrier means mounted for movement along each of said track means, a screw conveyor rotatably mounted on and extending between the carrier means and being positioned within said receptacle adjacent the bottom surface thereof, first power means to rotate said screw conveyor about its axis in direction to tend to convey material in the receptacle toward one end of the screw conveyor comprising a drive shaft, means to rotatably mount said shaft on said receptacle, a first arm pivotally mounted on said drive shaft, a second arm pivotally mounted at the opposite end of said first arm from said drive shaft, and at the outer end thereof to the carrier means, a common shaft rotatably mounted at the junction between said first and second arms, said first and second arms being free to fold in jack-knife fashion relative to each other, and drive means extending from said power shaft, to said common shaft, and from said common shaft to the screw conveyor, and a pair of endless chains mounted for movement in planes parallel to and adjacent the track members, respectively, separate connecting link means, means attached to each of the chains and to the carrier on the adjacent track, and common power drive means to drive the pair of endless chains, the chains and their connecting link means being of size and positioned to move the carriers back and forth along the tracks when the chains are driven.

3. The combination as specified in claim 2 and means to limit the maximum force with which said chains can be driven.

4. The combination as specified in claim 3 and separate means exterior of said receptacle to move material away from the said one end of the screw conveyor.

5. The combination as specified in claim 4 wherein said receptacle is a forage box mounted on a trailer and said screw conveyor axis is substantially parallel to the longitudinal axis of the box.

6. An unloading device for a receptacle having a bottom surface and side walls, said device including a pair of tracks extending between the side walls at opposite ends thereof, separate carrier means mounted for unrestrained movement along each of said tracks, a screw conveyor rotatably mounted on and extending between the carrier means and being positioned within said receptacle adjacent to the bottom surface thereof, first power means to rotate said screw conveyor about its axis in direction to tend to convey material in the receptacle toward one end of the screw conveyor, and a pair of endless chains mounted for movement in planes parallel to and adjacent to the track members, respectively, separate connecting means operatively attached to each of the chains and cooperating to drive the carrier on the adjacent track, common power drive means to drive the pair of endless chains, the chains being positioned to move the carriers back and forth along the tracks when the chains are driven, and means to limit the maximum force with which said chains can be driven.

7. An unloading device for a receptacle comprising a forage box mounted on a trailer and having a bottom surface and side walls, said device including a pair of tracks extending between the side walls at opposite ends thereof, separate carrier means mounted for movement along each of said tracks, a screw conveyor rotatably mounted on and extending between the carrier means and being positioned within said receptacle adjacent the bottom surface thereof, said screw conveyor axis being substantially parallel to the longitudinal axis of the receptacle, first power means to rotate said screw conveyor about its axis in direction to tend to convey material in the receptacle toward one end of the screw conveyor, means exterior of said receptacle to move material away from said one end of said screw conveyor, said screw conveyor being movable in vertical direction, means to limit the movement of said screw conveyor toward the bottom surface of the receptacle, and a pair of endless chains mounted for movement in planes parallel to and adjacent the track members, respectively, separate connecting link means, means attached to each of the chains and to the carrier on the adjacent track, and common power drive means to drive the pair of endless chains, the chains and their connecting link means being of size and positioned to move the carriers back and forth along the tracks when the chains are driven, and means to limit the maximum force with which said chains can be driven.

8. An unloading device for a receptacle having a bottom surface and containing material capable of being conveyed by a screw conveyor, said device including a screw conveyor mounted in said receptacle adjacent the bottom surface thereof, means to rotate said screw conveyor about its axis in direction to convey material in the receptacle toward one end of the screw conveyor, and power means to move said screw conveyor substantially transverse to its axis of rotation within said receptacle at the same time it is rotating, said power means including slippage drive means that limits the maximum force exerted to cause said auger to move transversely, said slippage drive means having an input and an output and including means that permits extensive slipping between the input and output without substantial change in the force transmitted thereby so that said auger is urged transversely into the material in said receptacle under a substantially constant predetermined force.

References Cited

UNITED STATES PATENTS

| 812,230 | 2/1906 | Raymond | 214—17 |
| 2,522,888 | 9/1950 | Nickerson | 198—224 |
| 2,562,427 | 7/1951 | Hurter | 214—17 |
| 3,212,652 | 10/1965 | Roberts | 214—17 |

FOREIGN PATENTS

| 86,597 | 6/1936 | Sweden. |

GERALD M. FORLENZA, *Primary Examiner.*

ALBERT J. MAKAY, *Examiner.*